United States Patent [19]

Winder

[11] Patent Number: 5,343,903

[45] Date of Patent: *Sep. 6, 1994

[54] METHOD OF TRANSFERRING A LIQUID TO A RESERVOIR USING A STORAGE BAG HAVING A PASSAGE THERETHROUGH

[76] Inventor: D. Howard Winder, 25 Wendell Avenue, Weston, Ontario, M9N 3K6, Canada

[*] Notice: The portion of the term of this patent subsequent to Mar. 2, 2010 has been disclaimed.

[21] Appl. No.: 890,209

[22] Filed: May 29, 1992

Related U.S. Application Data

[63] Continuation-in-part of Ser. No. 709,260, Jun. 3, 1991, Pat. No. 5,190,081.

[51] Int. Cl.$^5$ .............................................. B65D 47/36
[52] U.S. Cl. ...................................... 141/10; 141/114; 141/329; 141/313; 141/363; 141/375; 222/83; 222/87; 222/81; 383/200
[58] Field of Search ................ 141/1, 10, 329, 330, 141/114, 313, 314, 98, 363–366, 375; 383/200, 202, 7; 222/81, 83, 83.5, 87, 88

[56] References Cited

U.S. PATENT DOCUMENTS

| | | | |
|---|---|---|---|
| 1,028,542 | 6/1912 | Christian | 141/330 |
| 1,635,563 | 7/1927 | Sanford | 222/83.5 |
| 2,083,479 | 6/1937 | Speare . | |
| 2,107,818 | 10/1935 | Reynolds | 141/330 |
| 2,107,995 | 2/1938 | Statham et al. | 141/330 |
| 2,111,715 | 3/1938 | Winfree | 141/364 |
| 2,116,918 | 5/1938 | Walker | 222/83.5 |
| 2,350,836 | 6/1944 | Sonneborn et al. | 222/84 |
| 2,990,101 | 6/1961 | Mead et al. | 229/53 |
| 3,008,837 | 11/1961 | Kaplan | 383/200 X |
| 3,088,654 | 5/1963 | Perino et al. | 229/85 |
| 3,146,912 | 9/1964 | Twersky | 222/107 |
| 3,186,625 | 6/1965 | Mead et al. | 229/53 |
| 3,189,227 | 6/1965 | Hobbs et al. | 222/94 |
| 3,240,327 | 3/1966 | Brina . | |
| 3,288,178 | 11/1966 | Johnson | 141/330 |
| 3,386,604 | 6/1968 | Fields | 215/11 |
| 3,606,962 | 9/1971 | Scholle | 222/105 |
| 3,804,134 | 4/1974 | Wehking | 141/98 |
| 3,873,735 | 3/1975 | Chalen et al. | 383/200 |
| 3,891,775 | 6/1975 | Murray et al. | 383/202 X |
| 3,915,212 | 10/1975 | Bujan et al. | 383/200 X |
| 4,010,786 | 3/1977 | Aguettant et al. | 150/8 |
| 4,322,019 | 3/1982 | Smith | 222/83.5 |
| 4,474,016 | 10/1984 | Winchell | 62/60 |
| 4,676,281 | 6/1987 | Nord | 141/1 |
| 4,696,404 | 9/1987 | Corella | 383/200 |
| 4,732,299 | 3/1988 | Hoyt | 222/94 |
| 5,190,081 | 3/1993 | Winder | 141/1 |

FOREIGN PATENT DOCUMENTS

| | | | |
|---|---|---|---|
| 1045084 | 12/1978 | Canada | 222/81 |
| 1116131 | 1/1982 | Canada . | |
| 1267615 | 5/1968 | Fed. Rep. of Germany | 222/81 |
| 1459262 | 10/1966 | France . | |
| 645590 | 8/1962 | Italy | 141/330 |

*Primary Examiner*—Ernest G. Cusick
*Attorney, Agent, or Firm*—Bereskin & Parr

[57] ABSTRACT

A liquid storage bag is provided. The bag has a passage extending through the liquid filled cavity. The bag is specially adapted for use with a transfer device which has a guide extending upwardly within a container, the guide merging at its lower end to a cutting blade. The passage thus facilitates positioning of the bag to a cutting position by lowering the bag into the container with the guide passing through the passage, whereupon the bag may be pulled upon the blade to cut open the bag and thereby allow the liquid to flow out within the container of the transfer device.

5 Claims, 3 Drawing Sheets

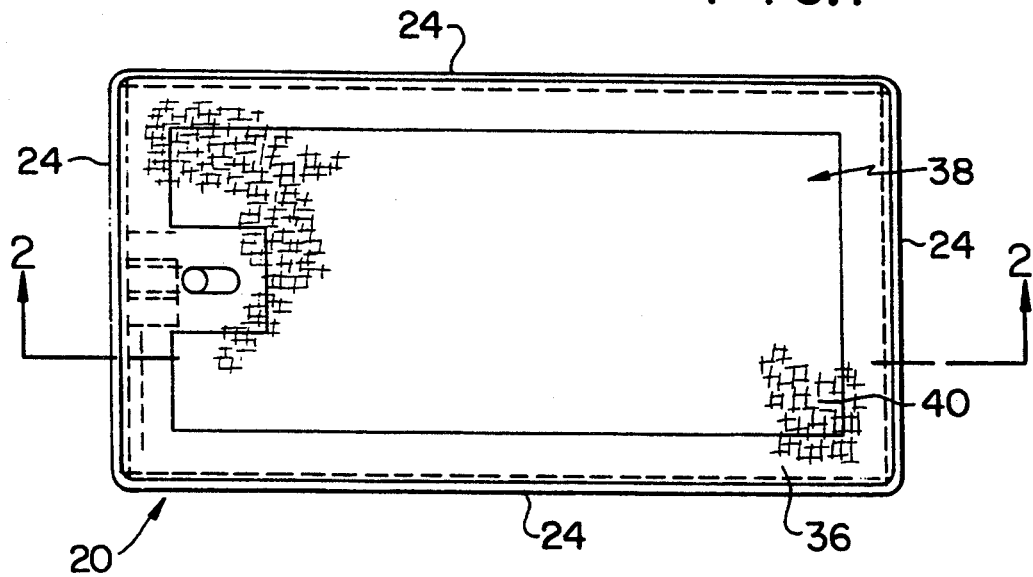
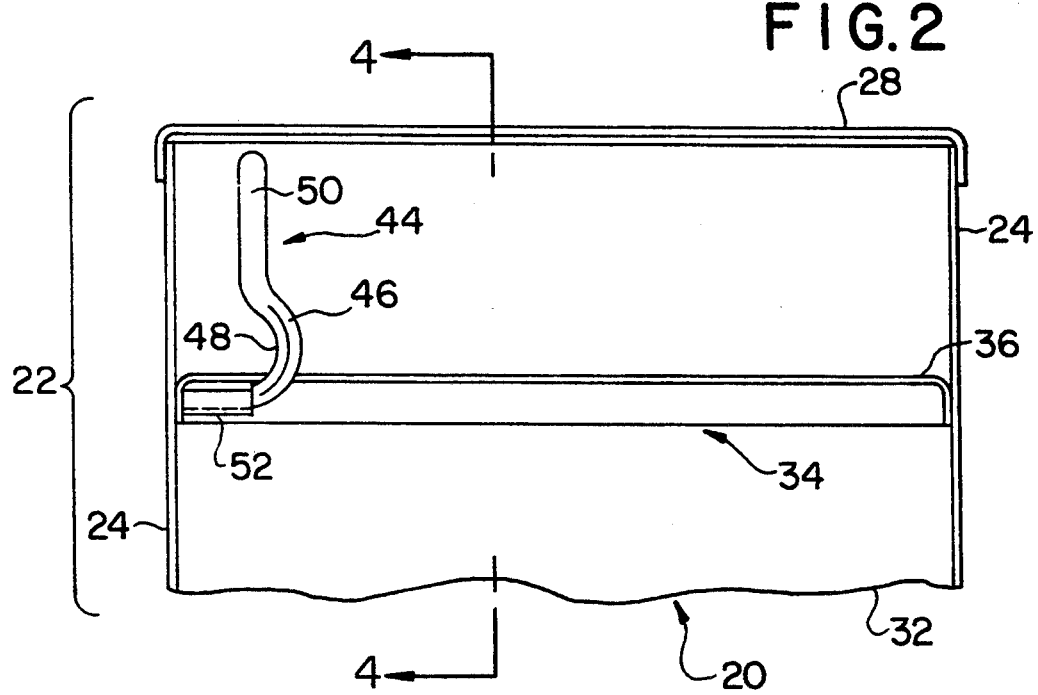

METHOD OF TRANSFERRING A LIQUID TO A RESERVOIR USING A STORAGE BAG HAVING A PASSAGE THERETHROUGH

This application is a continuation-in-part from application Ser. No. 07/709,260, filed Jun. 3, 1991, now U.S. Pat. No. 5,190,081.

FIELD OF THE INVENTION

This invention relates to devices and bags for the transfer of liquid into a reservoir.

BACKGROUND OF THE INVENTION

Most automobiles have a windshield washer system which dispenses a liquid from a liquid reservoir through a jet onto the windshield. When it is expected that the vehicle will be operated in below freezing conditions, the reservoir for the windshield washing system is generally filled with an alcohol solution referred to as "windshield washer fluid" which will not freeze if sprayed onto a cold windshield. Windshield washer fluid has up to now generally been sold in plastic bottles of approximately 4 liters capacity.

A typical windshield washer fluid reservoir has an opening of approximately two inches diameter which makes filling somewhat difficult in view of the size of typical windshield washer fluid bottles. The filling of windshield washer fluid reservoirs is further complicated by the fact that they are generally located in the engine compartment of an automobile and are surrounded by various structures that prevent the windshield washer fluid bottle from being placed close to the filling opening of the reservoir.

It is an object of the present invention to provide a device which facilitates the filling of a windshield washer fluid reservoir.

It is a further object of the present invention to provide such a device which accepts windshield washer fluid in bags. It is a still further objective of the present invention to provide such a device which is both easy and safe to use.

SUMMARY OF THE INVENTION

In accordance with the present invention, a liquid filled storage bag is provided comprising at least one flexible web impermeable to the liquid, sealed together to define an enclosed cavity containing the liquid between first and second web walls, the first and second web walls having aligned openings at which they are also sealed together such that the openings define a passage through the liquid-containing cavity of the bag.

A device is also provided which is adapted to transfer liquid from such a liquid filled sealed bag having a passage therethrough to a liquid reservoir. The device comprises a generally upstanding container dimensioned to receive such a bag, having an open top and at least one side wall, with a bag support permeable to the liquid extending within the container below the top, a cutter to open the bag positioned above the bag support and having a blade which faces the side wall and is proximal thereto, a guide for facilitating positioning of the bag to a cutting position, extending upwardly above the cutter and being dimensioned to be received through the passage of the bag, and fluid communication means below the bag support for directing the liquid to the reservoir. The guide, the bag support and the cutter are in spaced relationship within the container such that in use the bag may be lowered onto the bag support with the guide passing through the passage of the bag, directing the bag to a position adjacent the blade of the cutter, whereupon the bag may be pulled upon the blade to cut open the bag and thereby allow the liquid to flow out of the bag and thence through the bag support and the fluid communication means to the reservoir.

The bag is preferably made of a plastic material, such as polyethylene. Advantageously, the material is translucent to show when its contents have been drained, and the material is also adapted to be printed on with instructions, warnings, manufacturer's identifications and so forth.

The capacity of the bag is preferably small enough to facilitate handling, yet large enough to replenish substantially the reservoir. Preferably, the capacity of the bag is between 0.5 and 5 liters, most preferably from 1 to 2 liters. The shape of the bag should facilitate manufacturing, shipping, storage, and manipulation. Most preferably, the bag has a generally rectangular oblong shape. The container of the transfer device thus also advantageously has a similar generally rectangular oblong cavity, somewhat larger than the bag to facilitate insertion of the bag and pulling the bag upon the blade of the device to cut open the bag.

The passage through the bag is preferably proximal to one end of the bag, but preferably fully encircled by the liquid-containing cavity of the bag. Preferably, the passage is less than about 5 centimeters across, most preferably less than about 2 centimeters. Advantageously, the shape of the passage is generally circular to facilitate entry of and passing through by the guide of the transfer device. If desirable though, the shape of the passage could be a motif, to resemble the overall shape of a design trade mark of the manufacturer or other source, as authorized.

BRIEF DESCRIPTION OF THE DRAWINGS

A preferred embodiment of the present invention is described below with reference to the attached drawings in which:

FIG. 1 is a top plan view of a device according to the present invention with the top removed;

FIG. 2 is a sectional view on line 2—2 device of FIG. 1;

DETAILED DESCRIPTION OF THE PREFERRED EMBODIMENTS

Figure 3:
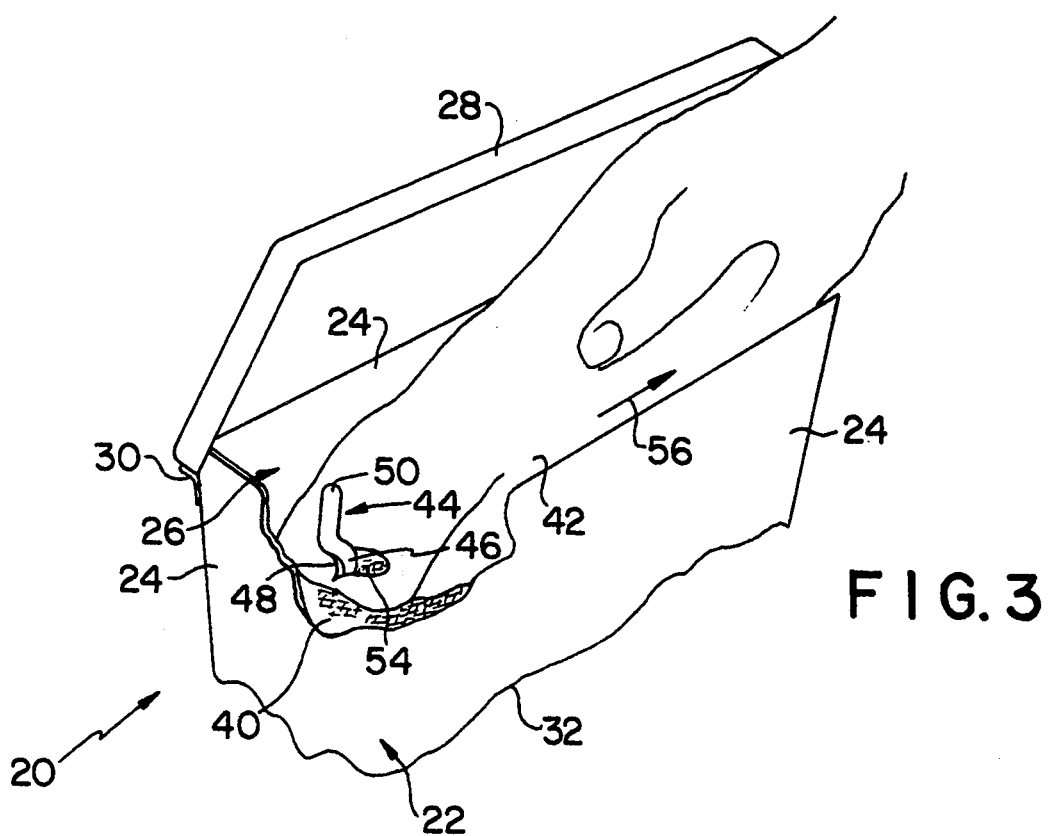
FIG. 3 is a perspective view of a device according to the present invention in use.

A liquid transfer device 20 according to the present invention is illustrated in FIGS. 1 through 4. The device 20 includes a generally upstanding container 22 which is defined by four opposed sidewalls 24. The container 22 has an open top 26 which may be covered by a lid 28 shown in FIGS. 2, 3 and 4 but omitted from FIG. 1 for clarity. The lid 28 is attached to one of the side walls 24 by a hinge 30 which extends along that side wall 24. A liquid reservoir (not shown) would be provided beneath the bottom 32 of the container 22.

A device 20 according to the present invention may be formed as part of a liquid reservoir or may be connected to a remote liquid reservoir through a suitable conduit. The bottom 32 of the container 22 thus provides fluid communication means for directing the liquid to the liquid reservoir, either with or without such a conduit. The bottom 32 of the container 22 thus provides fluid communication means for directing the liquid to the liquid reservoir.

A bag support 34 extends across the container 22 below the top 26. The bag support 34 includes a generally rectangular frame 36 which runs along the side walls 24 of the container 22 and defines a generally rectangular opening 38 in FIG. 1. A screen 40 supported by the frame 36 extends across the rectangular opening 38. The bag support 34 provides a structure on which a bag 42 in FIG. 3 may be placed within the upper part of the container 22. Furthermore, by virtue of the screen 40, the bag support 34 is liquid permeable as liquid can pass the bag support by flowing through the openings in the screen 40.

Figure 4:
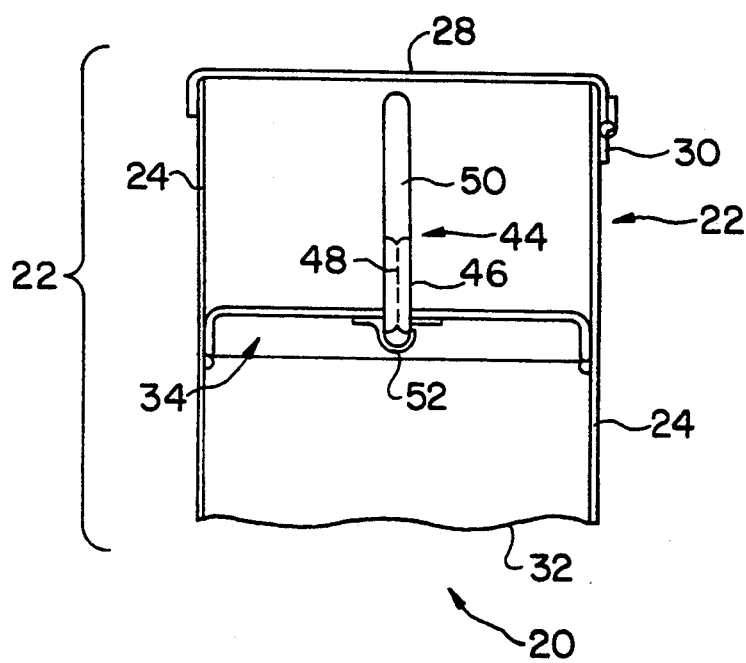
FIG. 4 is a sectional view on line 4—4 of FIG. 2.
Figure 5:
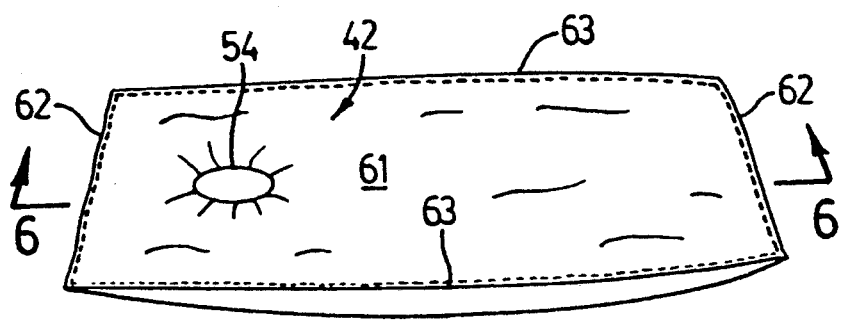
FIG. 5 is a perspective view of a bag according to the present invention.
Figure 6:
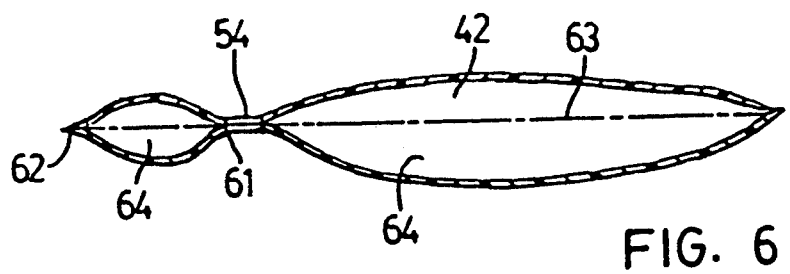
FIG. 6 is a sectional view along the line 6—6 of FIG. 5.
Figure 7:
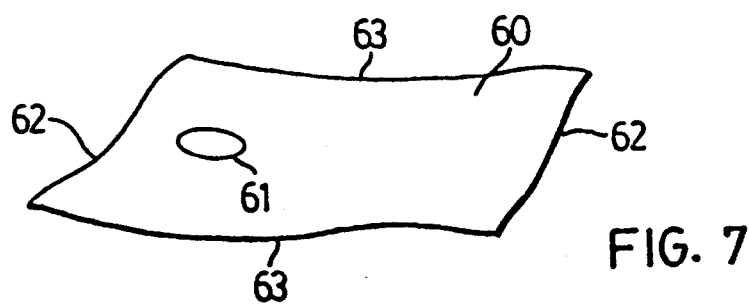
FIG. 7 is a perspective view of a portion of the bag of FIG. 5, prior to assembly.

A cutter 44 extends upwardly from the bag support 34. The cutter has a curved portion 46 the inside part of which is sharpened to define a generally arcuate shaped blade 48 facing the adjacent side wall 24. The curved portion 46 of the cutter 44 extends through the bag support 34 as best shown in FIGS. 2 and 4. The cutter 44 also has a straight portion 50 extending upwardly from the curved portion 46 and generally parallel to the adjacent side wall 24. The curved portion 46 of the cutter 44 is mounted in a socket 52 on the underside of the frame 36 of the bag support 34. Other suitable ways of mounting the cutter 44 may be used. For example, the cutter 44 may be attached directly to the side wall 24 adjacent to it.

The device 20 as illustrated in FIG. 3, is intended for use with a liquid bag 42 having a passage 54 extending through it, the passage 54 being fully surrounded by t-he liquid containing cavity 64 of the bag 42. In use, the passage 54 is placed over the straight portion 50 of the cutter 44 and urged toward the bag support 34 using the straight portion 50 as a guide. Once the passage 54 has been passed far enough along the cutter 44 to encounter the blade 48, the liquid bag 42 is pulled upon the blade 48 in the direction of arrow 56 in FIG. 3 to cause the blade 48 to sever the bag adjacent the passage 54. Once the bag has been severed, liquid from within the bag will escape past the severed portion, pass through the screen 40 of the bag support 34, be filtered by the screen and flow into a reservoir fluidly communicating with the bottom 32 of the device 20.

An advantage of the device 20 of the present invention is that the upper part of the container 22 is dimensioned to receive a liquid bag 42 so that once the bag has been severed, fluid from the bag will flow into the reservoir without any requirement to seal the severed opening to the device to prevent liquid from escaping out of the device. A further advantage of the device 20 is that the blade 48 of the cutter 44 does not face the opening 26 but rather faces an adjacent side wall 24. This reduces the possibility of injury to the user if the user places their hand within the container 22. The straight portion 50 of the cutter 44 thus acts not only as a guide means as noted above, but also as a guard means for shielding against unintentional contact with the blade.

The bag 42 consists of two similar rectangular heat sealable plastic sheets 60 which are sealed together along their side edges 63 and their end edges 62. Multiples of such bags may be made from two strips of plastic in a manner known to those skilled in the art. In an alternative embodiment, the bag could be made from a single sheet of plastic folded over and sealed along three edges.

Each of the two sheets 60 has a opening 61 along which the two sheets are also sealed to define a passage 54 extending through the liquid containing cavity 64 of the bag 42.

The bag 42 is pre-formed with the edges 62 at the end proximal the passage 54 being left unsealed. With this end oriented upwardly, the bag is then filled with the liquid and subsequently the edges of the open end are also sealed such that the bag 42 thus provides a liquid-containing enclosed cavity 64 with a passage 54 extending therethrough.

The above description should be interpreted in an illustrative rather than a restrictive sense. Variations to the present invention may be apparent to those skilled in the relevant art without departing from the spirit and scope of the present invention which is defined in the claims set out below. For example, if screening or filtering of the fluid is not desired, the bag support may be made from a perforated sheet or a grid with relatively large openings. Furthermore, although a rectangular container has been illustrated, other suitable shapes such as cylindrical, oval, etc. may be used.

I claim:

1. A method of transferring a liquid to a reservoir, comprising the steps of:
   (a) selecting a storage bag comprising at least one flexible web impermeable to said liquid sealed to define an enclosed cavity containing said liquid and having a passage therethrough at least partially surrounded by said liquid;
   (b) positioning said bag in alignment with a receptacle dimensioned to receive said bag, and having a cutter therein to open said bag and a guide to facilitate positioning of said bag to a cutting position, said guide extending upwardly above said cutter and being dimensioned to be received through said passage of said bag, and also having fluid communication means for directing said liquid to said reservoir;
   (c) moving said bag into said receptacle with said guide passing through said passage of said bag such that said bag is directed to a position in which said passage is adjacent said cutter; and
   (d) pulling said bag upon said cutter to cut open said bag thereby allowing said liquid to flow out of said bag and thence through said fluid communication means to said reservoir.

2. The method of claim 1, wherein said liquid is an automotive liquid.

3. The method of claim 2, wherein said bag is positioned in vertical alignment above said receptacle in step (b), and is moved into said receptacle in step (c) through lowering it therein by means of gravity.

4. The method of claim 1, 2 or 3, wherein said receptacle comprises a generally upstanding container with at least one side wall and wherein said cutter comprises a blade facing said side wall and proximal thereto.

5. A method of transferring automotive windshield washer fluid to a reservoir provided for such windshield washer fluid on an automotive vehicle, the method comprising the steps of:
   (a) selecting a storage bag containing said windshield washer fluid, said bag comprising at least one flexible web impermeable to said windshield washer fluid, sealed to define an enclosed cavity containing said windshield washer fluid between first and second web walls that have aligned openings at which said web walls are also sealed together such that said openings define a passage through said windshield washer fluid containing cavity of said bag;

(b) placing said bag above a transfer device that fluidly communicates with said reservoir, said transfer device comprising a generally upstanding container dimensioned to receive said bag, having an open top and at least one side wall, with a bag support permeable to said windshield washer fluid extending within said container below said top, and having a cutter with a blade to open said bag positioned above said bag support, and having a guide to facilitate positioning of said bag to a cutting position, said guide extending upwardly above said cutter and being dimensioned to be received through said passage of said bag, and also having fluid communication means below said bag support for directing said windshield washer fluid to said reservoir;

(c) lowering said bag into said container on to said bag support with said guide passing through said passage of said bag such that said bag is directed to a position in which said passage is adjacent said blade of said cutter; and (d) pulling said bag upon said blade to cut open said bag and thereby allowing said windshield washer fluid to flow out of said bag and thence through said bag support and said fluid communication means to said reservoir.

* * * * *